United States Patent
Louboutin et al.

(10) Patent No.: US 8,438,408 B2
(45) Date of Patent: May 7, 2013

(54) CONTROL OF ACCESSORY COMPONENTS BY PORTABLE COMPUTING DEVICE

(75) Inventors: Sylvain R. Y. Louboutin, Sunnyvale, CA (US); Scott Krueger, San Francisco, CA (US); Terry Tikalsky, Sunnyvale, CA (US); Roberto G. Yepez, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 401 days.

(21) Appl. No.: 12/764,019

(22) Filed: Apr. 20, 2010

(65) Prior Publication Data

US 2011/0185204 A1 Jul. 28, 2011

Related U.S. Application Data

(60) Provisional application No. 61/298,441, filed on Jan. 26, 2010.

(51) Int. Cl.
*G06F 1/32* (2006.01)
*G06F 1/00* (2006.01)
*H04N 5/63* (2006.01)

(52) U.S. Cl.
USPC .............. 713/320; 713/300; 348/730

(58) Field of Classification Search ............. 713/300, 713/320
See application file for complete search history.

(56) References Cited

U.S. PATENT DOCUMENTS

| | | | |
|---|---|---|---|
| 4,673,861 A | 6/1987 | Dubovsky et al. | |
| 5,150,031 A | 9/1992 | James et al. | |
| 5,402,183 A * | 3/1995 | Tanaka | 348/705 |
| 5,541,985 A * | 7/1996 | Ishii et al. | 379/111 |
| 6,007,372 A | 12/1999 | Wood | |
| 6,012,105 A | 1/2000 | Rubbmark et al. | |
| 6,130,518 A | 10/2000 | Gabehart et al. | |
| 6,161,027 A | 12/2000 | Poirel | |
| 6,169,387 B1 | 1/2001 | Kaib | |
| 6,184,652 B1 | 2/2001 | Yang | |
| 6,184,655 B1 | 2/2001 | Malackowski | |
| 6,204,637 B1 | 3/2001 | Rengan | |
| 6,211,581 B1 | 4/2001 | Farrant | |
| 6,211,649 B1 | 4/2001 | Matsuda | |
| 6,252,380 B1 | 6/2001 | Koenck | |
| 6,271,605 B1 | 8/2001 | Carkner et al. | |

(Continued)

FOREIGN PATENT DOCUMENTS

JP 07245725 A * 9/1995
JP 2001-069165 A 3/2001

(Continued)

*Primary Examiner* — Suresh Suryawanshi
(74) *Attorney, Agent, or Firm* — Kilpatrick Townsend & Stockton LLP

(57) ABSTRACT

A portable computing device (PCD) can control the operating state of a component within an accessory. For example, an accessory can have some components (e.g., a video processor) that are used for some operations but not for others. A PCD can determine whether a particular component will be used and can instruct the accessory to set the component to a desired state, e.g., powered up when in use and powered down when not in use. In some embodiments, the PCD can use status information provided by the accessory in determining a desired state for the accessory component. For example, in the case of a video converter accessory, if no display device or other video receiver is connected to the accessory, a video processor within the accessory can be powered down.

24 Claims, 5 Drawing Sheets

U.S. PATENT DOCUMENTS

| | | | |
|---|---|---|---|
| 6,316,916 B2 | 11/2001 | Bohne | |
| 6,353,894 B1 | 3/2002 | Pione | |
| 6,411,330 B1 * | 6/2002 | Purcell et al. | 348/180 |
| 6,608,264 B1 | 8/2003 | Fouladpour | |
| 6,614,232 B1 | 9/2003 | Mukai | |
| 6,653,813 B2 | 11/2003 | Khatri | |
| 6,665,803 B2 | 12/2003 | Lunsford et al. | |
| 6,725,061 B1 | 4/2004 | Hutchison, IV et al. | |
| 7,167,935 B2 | 1/2007 | Hellberg | |
| 7,215,042 B2 | 5/2007 | Yan | |
| 7,293,122 B1 | 11/2007 | Schubert et al. | |
| 7,296,107 B2 * | 11/2007 | Lunsford et al. | 710/304 |
| 7,529,870 B1 | 5/2009 | Schubert et al. | |
| 7,558,894 B1 | 7/2009 | Lydon et al. | |
| 7,633,963 B1 | 12/2009 | Anderson et al. | |
| 7,643,895 B2 | 1/2010 | Gupta et al. | |
| 8,125,572 B2 * | 2/2012 | Koo | 348/730 |
| 2001/0003205 A1 | 6/2001 | Gilbert | |
| 2001/0006884 A1 | 7/2001 | Matsumoto | |
| 2002/0156949 A1 | 10/2002 | Kubo et al. | |
| 2003/0110403 A1 | 6/2003 | Crutchfiled et al. | |
| 2003/0220988 A1 | 11/2003 | Hymel | |
| 2004/0003300 A1 | 1/2004 | Malueg et al. | |
| 2004/0103223 A1 | 5/2004 | Gabehart et al. | |
| 2004/0224638 A1 | 11/2004 | Fadell et al. | |
| 2007/0141985 A1 | 6/2007 | Parkkinen et al. | |
| 2007/0201705 A1 | 8/2007 | Dorogusker et al. | |

FOREIGN PATENT DOCUMENTS

| | | |
|---|---|---|
| JP | 2003-032351 A | 1/2003 |
| WO | WO 99/26330 A2 | 5/1999 |
| WO | WO 00/39907 A1 | 7/2000 |

* cited by examiner

CONTROL OF ACCESSORY COMPONENTS BY PORTABLE COMPUTING DEVICE

CROSS-REFERENCE TO RELATED APPLICATION

This application claims the benefit of U.S. Provisional Application No. 61/298,441, filed Jan. 26, 2010, entitled "Control of Accessory Components by Portable Computing Device," the disclosure of which is incorporated by reference herein in its entirety.

BACKGROUND

The present disclosure relates generally to portable computing devices that interact with accessories and in particular to control of accessory components by the portable computing device.

In recent years, a number of portable computing devices (PCDs) have been developed. Examples of PCDs include portable media players, mobile phones, personal digital assistants (PDAs), portable e-mail devices, video game players, portable navigation units relying on Global Positioning System (GPS) satellite data, and multi-function devices that can integrate numerous functions such as media storage and playback, mobile phone, Internet access, e-mail, personal information management, game play, GPS/navigation capability, and the like. Examples of multi-function PCDs include various iPhone® and iPod® models manufactured and sold by Apple Inc., assignee of the present application, as well as other portable electronic devices made and sold by other manufactures and distributors under their respective brand names.

PCDs often obtain operating power from a battery within the device. Since a battery can provide only a finite amount of energy before requiring recharging or replacement, PCDs often employ various power-saving techniques to extend battery life.

PCDs are frequently docked with other electronic devices, referred to herein as "accessories." For example, from time to time, a user may dock a PCD with a personal computer to synchronize media content and/or metadata, personal data, and the like. A user may at other times dock the same PCD with other electronic devices, such as an in-vehicle media system, a speaker dock, or the like. Some accessories may provide power to the PCD from an external source, e.g., to recharge the PCD's battery or for use as operating power, and may also use power from an external source for their own operations. Other accessories draw their operating power from the PCD.

BRIEF SUMMARY

Certain embodiments of the present invention enable a PCD to control the operating state of a component within an accessory. For example, an accessory can have some components (e.g., a video processor) that are used for some operations but not for others. A PCD can determine whether a particular component should be used and can instruct the accessory to set the component to a desired state, e.g., powered up when in use and powered down when not in use. In some embodiments, the PCD can use status information provided by the accessory in determining a desired state for the accessory component. For example, in the case of a video converter accessory, if no display device or other video receiver is connected to the accessory, a video processor within the accessory can be powered down. In addition, the PCD can use information not available to the accessory in determining the desired state of the component. Examples of such information include user preferences that have been communicated to the PCD, battery status of the PCD, whether a functionality of the component is useful in a given operating context (e.g., whether the PCD will be supplying a video signal to a video processor) and so on.

One aspect of the invention relates to methods of operating an accessory capable of connecting to a receiving device. For example, the accessory can establish a connection to a portable computing device and can report to the portable computing device when status of a connection to the receiving device changes. The accessory can receive a state-control command from the portable computing device; the state-control command instructs the accessory to set a state of a component of the accessory to a specified state. In response to this command, the accessory can set the state of the component to the specified state.

Another aspect of the invention relates to a method of operating a portable computing device. For example, the portable computing device can establish a connection to an accessory having a component and can receive status notifications from the accessory. Based in part on the status notification, the portable computing device can determine a desired state for the component of the accessory and can send a state-control command to the accessory to instruct the accessory to set a state of the component to the desired state.

Another aspect of the invention relates to an accessory for use with a portable computing device. The accessory can have an interface configured to communicate with the portable computing device and a video output port configured to communicate with an external display device. A video processor in the accessory can be configured to process an input video signal (e.g., a signal received from the portable computing device) and to provide an output video signal to the video output port. A controller coupled to the interface and the video processor can determine whether a display device is connected to the video output port and report a connection status of the video output port to the portable computing device; receive a state-control command from the portable computing device, the state-control command specifying whether the video processor should be powered up or powered down; and power up or power down the video processor in response to the state-control command.

Another aspect of the present invention relates to a portable computing device. The portable computing device can have an interface configured to communicate with an accessory and to provide a video signal to the accessory and a processor coupled to the interface. The processor can receive a status notification from the accessory indicating whether a video display device is connected to the accessory; determine a desired state of a video processor of the accessory, the determination being based in part on the received status notification and in part on whether the portable computing device is generating a video signal; and send a state-control command to the accessory, the state-control command instructing the accessory to set a state of the video processor to the desired state.

The following detailed description together with the accompanying drawings will provide a better understanding of the nature and advantages of the present invention.

DETAILED DESCRIPTION

Certain embodiments of the present invention enable a PCD to control the operating state of a component within an accessory. For example, an accessory can have some components (e.g., a video processor) that are used for some operations but not for others. A PCD can determine whether a particular component will be used and can instruct the accessory to set the component to a desired state, e.g., powered up when in use and powered down when not in use. In some embodiments, the PCD can use status information provided by the accessory in determining a desired state for the accessory component. For example, in the case of a video converter accessory, if no display device or other video receiver is connected to the accessory, a video processor within the accessory can be powered down. In addition, the PCD can use information not available to the accessory in determining the desired state of the component. Examples of such information include user preferences that have been communicated to the PCD, battery status of the PCD, whether a functionality of the component is useful in a given operating context (e.g., whether the PCD will be supplying a video signal to a video processor) and so on.

Figure 1:
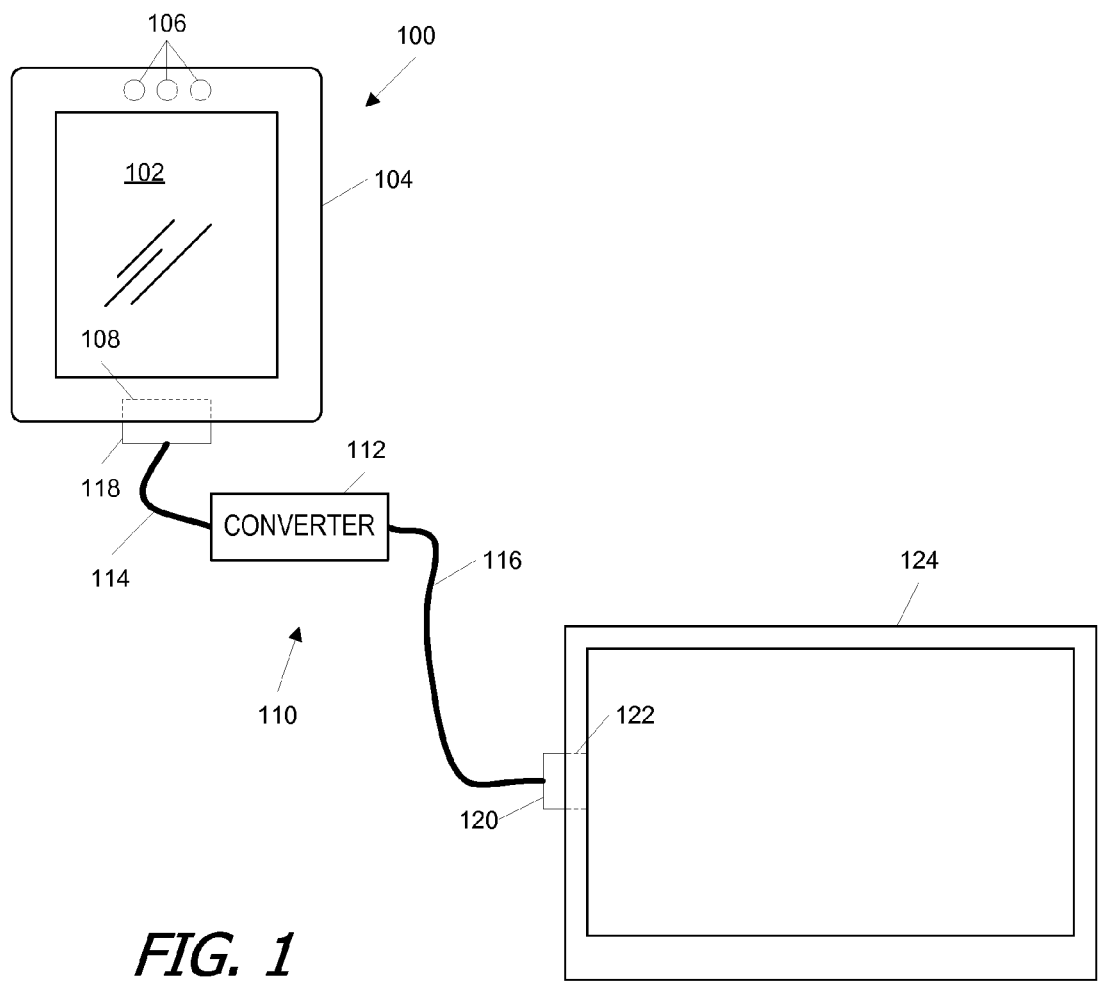
FIG. 1 is a front view of a portable computing device (PCD) connected to an accessory according to an embodiment of the present invention.

FIG. 1 is a front view of a portable computing device (PCD) 100 connected to an accessory 110 according to an embodiment of the present invention. PCD 100 can have a touchscreen display 102 surrounded by bezel 104. Control buttons 106 are provided in bezel 104 and can be used, e.g., to wake PCD 100 from hibernation, to put PCD 100 into hibernation, or to provide other input to PCD 100.

PCD 100 can have a connector 108 recessed into a bottom surface thereof, allowing PCD 100 to become attached to an accessory device. Connector 108 can include a number of pins for carrying power, analog, and digital signals between PCD 100 and a connected accessory. In one embodiment, connector 108 can be implemented as a 30-pin docking connector as used in existing iPod® and iPhone® products sold by Apple Inc., assignee of the present application. In some embodiments, connector 108 is recessed into the housing of PCD 100 and is referred to as a "receptacle" connector. Other connectors can also be used.

PCD 100 is shown connected to accessory 110, which can be a cable adapter, e.g., for video signals. In this embodiment, accessory 110 includes a converter 112, first cable 114, and second cable 116. First cable 114 can terminate in a connector 118 that mates with connector 108 of PCD 100. Second cable 116 can terminate in a connector 120 that mates with a connector 122 of a display device 124. For example, display device 124 can be a high-resolution monitor, and connectors 120 and 122 can conform to a standard video protocol such as High Definition Multimedia Interface (HDMI), component video, S-video, digital visual interface (DVI), or the like. It is to be understood that cable 116 and connectors 120 and 124 can conform to standards associated with a particular video protocol.

Converter 112 can include electronic components configured to convert video signals received via first cable 114 to a format compatible with display device 124. For example, PCD 100 can provide a video signal in a format such as DisplayPort (an open industry standard promulgated by the Video Electronics Standards Association) via connector 108. Converter 112 can convert the received video signal to a different format, which can be an analog or digital format, and deliver the signals to display device 124 via second cable 116. In some embodiments, converter 112 can be a fixed-function converter, capable of converting a single preselected input video format to a single preselected output video format. In other embodiments, converter 112 can be configurable as to input and/or output video formats. Converter 112 can be physically located within either of connectors 118 or 120, or it can be disposed between the connectors as desired.

In some embodiments, converter 112 can draw its operating power from PCD 100, e.g., via cable 114. Converter 112 can include components that consume significant power, such as signal drivers, modulators, or codecs. To reduce the power demand on PCD 100, PCD 100 can instruct accessory 110 to power down converter 112 when video conversion is not needed. For example, if PCD 100 is not currently generating a video signal or if PCD 100 is delivering a video signal on an different path (e.g., to its own display), PCD 100 can instruct accessory 110 to power down converter 112. Specific examples are described below.

In addition, if accessory 110 is not connected to a video receiver (also referred to herein as a video "sink") such as display 124, operation of converter 112 can be a waste of power. Accordingly, in some embodiments, accessory 110 can notify PCD 100 as to whether a video receiver is connected to cable 116, and PCD 100 can use this information in determining whether to instruct accessory 110 to power down converter 112. Specific examples are described below.

It will be appreciated that the system described herein is illustrative and that variations and modifications are possible. For example, while PCD 100 is shown as a tablet computer, PCD 100 can have a variety of form factors and configurations, e.g., smart phone, personal digital assistant, media player, portable web browser, notebook computer, etc.

Further, accessory 110 is not limited to being a video accessory. Other accessories may include "power-hungry" components that are only used or useful under certain operating conditions. For example, some accessories include radio transmitters and/or radio receivers (e.g., for WiFi, Bluetooth, FM, etc.) or an infrared transmitter or receiver that may consume significant power when in use. The PCD can determine whether the transmitter/receiver components should be powered up or down, e.g., based on user preferences, currently executing application programs (e.g., an FM receiver might be powered up when a radio-playing application is being executed and powered down otherwise), and/or information about the status of the accessory (such as whether it is currently configured to transmit and/or receive signals). As another example, an accessory can include hardware for reading from and/or writing to a removable storage medium (e.g., flash memory card, optical disk, or the like). Such hardware can be powered down when no storage medium is inserted in the accessory and powered up when a storage medium is inserted and PCD 100 is ready to invoke a storage-related operation. A range of accessories can therefore benefit from being able to dynamically power up or power down such components based on signals from a PCD.

Figures 2, 3:
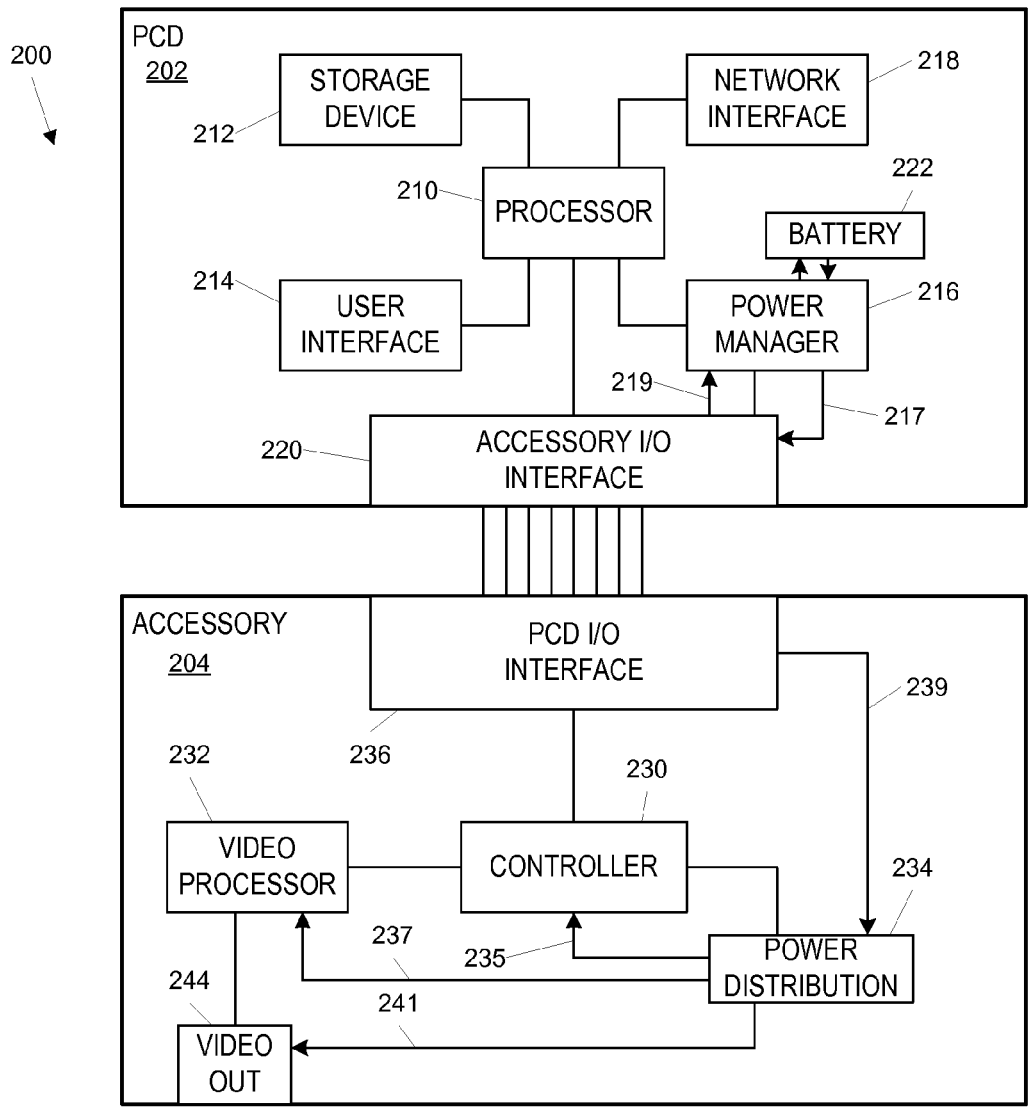
FIG. 2 is a simplified block diagram of a system including a PCD connected to an accessory according to an embodiment of the present invention.
FIG. 3 is a table listing commands usable to support control of an accessory component by a PCD according to an embodiment of the present invention.

FIG. 2 is a simplified block diagram of a system 200 including PCD 202 and accessory 204 according to an embodiment of the present invention. In this embodiment, PCD 202 (e.g., implementing PCD 100 of FIG. 1) can provide computing, communication and/or media playback capability. PCD 202 can include processor 210, storage device 212, user interface 214, power manager 216, network interface 218, accessory input/output (I/O) interface 220, and battery 222. PCD 202 can also include other components (not explicitly shown) to provide various enhanced capabilities.

Storage device 212 can be implemented, e.g., using disk, flash memory, or any other non-volatile storage medium. In some embodiments, storage device 212 can store media assets such as audio, video, still images, or the like, that can be played by PCD 202. Storage device 212 can also store other information such as a user's contacts (names, addresses, phone numbers, etc.); scheduled appointments and events; notes; and/or other personal information. In some embodiments, storage device 212 can store one or more application programs to be executed by processor 210 (e.g., video game programs, personal information management programs, media playback programs, etc.).

User interface 214 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 214 to invoke the functionality of PCD 202 and can view and/or hear output from PCD 202 via output devices of user interface 214.

Processor 210, which can be implemented as one or more integrated circuits (e.g., a conventional microprocessor or microcontroller), can control the operation of PCD 202. In various embodiments, processor 204 can execute a variety of programs in response to program code and can maintain multiple concurrently executing programs or processes. At any given time, some or all of the program code to be executed can be resident in processor 210 and/or in storage media such as storage device 212.

Through suitable programming, processor 210 can provide various functionality for PCD 202. For example, in response to user input signals provided by user interface 214, processor 210 can operate a database engine to navigate a database of media assets stored in storage device 212 in response to user input and display lists of selected assets. Processor 210 can respond to user selection of an asset (or assets) to be played by transferring asset information to a playback engine also operated by processor 210, thus allowing media content to be played. Processor 210 can also execute other programs to control other functions of PCD 202, including application programs that may be stored in storage device 212.

Power manager 216 provides power management capability for PCD 202. For example, power manager 216 can deliver power from battery 222 to accessory I/O interface 220 via line 217 and to other components of PCD 202 (power connections not shown). Power manager 216 can also receive power via accessory I/O interface 220 and line 219 and deliver received power to various components of PCD 202; power received via accessory I/O interface 220 can also be delivered to battery 222, thereby allowing battery 222 to be recharged via accessory I/O interface 220. As shown, power manager 216 can also deliver power to accessory I/O interface 220 via line 217, allowing PCD 202 to provide power to a connected accessory.

In some embodiments, power manager 216 can be implemented using programmable or controllable circuits operating in response to control signals generated by processor 210 in response to program code executing thereon, or as a separate microprocessor or microcontroller.

Power manager 216 can also provide other power management capabilities, such as regulating power consumption of other components of PCD 202 based on the source and amount of available power, monitoring stored power in the battery and generating user alerts if the stored power drops below a minimum level, and so on.

Network interface 218 can provide voice and/or data communication capability for PCD 202. In some embodiments network interface 218 can include radio frequency (RF) transceiver components for accessing wireless voice and/or data networks (e.g., using cellular telephone technology, advanced data network technology such as 3G or EDGE, WiFi (IEEE 802.11 family standards), or other mobile communication technologies, or any combination thereof), GPS receiver components, and/or other components. In some embodiments network interface 218 can provide wired network connectivity (e.g., Ethernet) in addition to or instead of a wireless interface. Network interface 218 can be implemented using a combination of hardware (e.g., antennas, modulators/demodulators, encoders/decoders, and other analog and/or digital signal processing circuits) and software components.

Accessory I/O interface 220 can allow PCD 202 to communicate with various accessories. For example, accessory I/O interface 220 can support connections to a computer, an external keyboard, a video adapter (e.g., as shown in FIG. 1), a speaker dock or media playback station, a digital camera, a radio tuner (e.g., FM, AM and/or satellite), an in-vehicle entertainment system, an external video device, a memory card reader, and so on. In some embodiments, accessory I/O interface 220 can include a connector, such as a 30-pin connector corresponding to the connector used on iPod® and iPhone® products, as well as supporting circuitry. The connector can provide connections for power and ground as well as for various wired communication interfaces such as Universal Serial Bus (USB), FireWire (IEEE 1394 standard), and/or universal asynchronous receiver/transmitter (UART). The connector can also provide connections for audio and/or video signals, which may be transmitted to or from PCD 202 in analog and/or digital formats. Thus, accessory I/O interface 220 can support multiple communication channels, and a given accessory can use any or all of these channels.

Accessory 204 (e.g., implementing accessory 110 of FIG. 1) can include controller 230, video processor 232, power distribution module 234, and PCD I/O interface 236. Accessory 204 is representative of a broad class of accessories that can interoperate with a PCD, and such accessories can vary widely in capability, complexity, and form factor. Various accessories may include components not shown in FIG. 2, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on.

Controller 230 can include, e.g., a microprocessor or microcontroller executing program code to perform various functions associated with accessory 204. For example, controller 230 can manage communications with PCD 202 via PCD I/O interface 236. Controller 230 can also configure other blocks within accessory 204, such as video processor 232.

Video processor 232, which can be implemented as one or more integrated circuits, can perform various video processing operations, such as converting an input video signal to a desired output format. Accordingly, video processor 232 can include modulators, demodulators, encoders, decoders, transcoders, and other components associated with video processing. Video processor 232 can deliver its output video signal to video-out port 244 for transmission to a display device. In some embodiments, the display device can be built into accessory 204, and video processor 232 can deliver signals directly to the display device.

Power distribution module 234 can provide power to components of accessory 204, e.g., to controller 230 (indicated by line 235), video processor 232 (indicated by line 237), and video output port 244 (indicated by line 241). In some embodiments, power distribution module 234 can receive power via PCD I/O interface 236 (indicated by line 239). In addition, in some embodiments, accessory 204 can be connected to an external power source (not shown), and power from the external source can also be provided to power distribution module 234. Power distribution module 234 can include control logic to determine, based on the available power sources at a given time, whether to draw operating power for accessory 204 from PCD 202 or from an external source. In some embodiments, power distribution module 234 can control whether power is delivered to various components, e.g., in response to control signals from controller 230.

PCD I/O interface 236 can allow accessory 204 to communicate with PCD 202. In accordance with some embodiments of the invention, PCD I/O interface 236 can include a connector that mates directly with a connector included in PCD 202, such as a 30-pin connector complementary to the connector used in various iPod® and iPhone® products. Such a connector can be used to supply power to PCD 202 and/or receive power from PCD 202, to send and/or receive audio and/or video signals in analog and/or digital formats, and to communicate information using various standard interfaces such as USB, UART, and/or FireWire. Other connectors may also be used; for example, PCD I/O interface 236 can incorporate a standard USB connector and can connect to accessory I/O interface 220 of PCD 202 via an adapter cable. In other embodiments, PCD I/O interface 236 can incorporate wireless communication (e.g., using Bluetooth) with accessory I/O interface 220.

Accessory 204 can be any electronic apparatus that interacts with PCD 202, including but not limited to video adapter accessory 110 of FIG. 1. In some embodiments, accessory 204 can provide remote control over operations of PCD 202, or a remote user interface that can include input controls and/or output devices. Accessory 204 in various embodiments can control any function of PCD 202 and can also receive media content from PCD 202 and present such content to the user (e.g., through audio speakers and/or video display screen, depending on the type of media content). In other embodiments, PCD 202 can control operations of accessory 204, such as retrieving stored data from a storage medium of accessory 204, initiating an image capture operation by a camera incorporated into accessory 204, etc.

It will be appreciated that the system configurations and components described herein are illustrative and that variations and modifications are possible. The PCD and/or accessory may have other capabilities not specifically described herein (e.g., mobile phone, global positioning system (GPS), broadband data communication, Internet connectivity, etc.).

Connectors at the respective I/O interfaces of the PCD and accessory can be complementary or not as desired. Where two connectors are not complementary, an adapter can be provided to connect the two devices. While connectors may be described herein as having pins, a term generally associated with conventional electronic devices having wires to connect components, it is to be understood that other signal paths (e.g., optical signaling) can be substituted. Further, in some embodiments, some of the connections can be wireless, and connectors can be omitted where wireless interfaces are provided.

Further, while the PCD and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Accessory I/O interface 220 of PCD 202 and PCD I/O interface 236 of accessory 204 allow PCD 202 to be connected with accessory 204 and subsequently disconnected from accessory 204. As used herein, a PCD and an accessory become "connected" whenever a communication channel is established between their respective interfaces and "disconnected" when the channel is terminated. Such connection can be achieved via direct physical connection, e.g., with mating connectors; indirect physical connection, e.g., via a cable; and/or wireless connection, e.g., via Bluetooth.

In some embodiments, a PCD and an accessory can communicate while connected by exchanging commands and data according to a PCD accessory protocol, also referred to herein as an "accessory protocol." The commands and data can be communicated, e.g., using any wired or wireless transport medium provided by the relevant interfaces.

The accessory protocol defines a format for messages to be exchanged between PCD 202 and any accessories connected thereto, such as accessory 204. For instance, the accessory protocol may specify that each message (also referred to herein as a command) is sent in a packet with a header and an optional payload. The header provides basic information (e.g., a start indicator, length of the packet, and a command code identifying a command to be processed by the recipient), while the payload provides any data associated with the command; the amount of associated data can be different for different commands, and some commands may provide for variable-length payloads. In some embodiments, the commands may be defined such that any particular command code is valid in only one direction. The packet can also include error-detection or error-correction codes as known in the art.

The accessory protocol can define a number of "lingoes," where a "lingo" is a group of related commands that can be supported (or unsupported) by various classes of accessories. In one embodiment, a command code can include a first byte identifying the lingo to which the command belongs and a second byte identifying the particular command within the lingo. Other command structures may also be used. It is not required that all accessories, or all PCDs to which an accessory can be connected, support every lingo defined within the accessory protocol.

In some embodiments, every accessory 204 and every PCD 202 that use the accessory protocol support at least a "general" lingo that includes commands common to the PCD and all accessories. The general lingo can include commands enabling the PCD and the accessory to identify and authenticate themselves to each other and to provide general information about their respective capabilities, including which (if any) other lingoes each supports. The general lingo can also include authentication commands that the PCD can use to verify the purported identity and capabilities of the accessory (or vice versa), and the accessory (or PCD) may be blocked from invoking certain (or all) commands or lingoes if the authentication is unsuccessful.

A PCD accessory protocol can also include various other lingoes, such as a simple remote lingo that allows an accessory to send a command indicating a function of the PCD to be invoked, a remote user interface lingo that can be used to communicate commands and data related to replicating all or part of a user interface of a PCD on an accessory (thereby supporting a more advanced remote control), a tuner lingo that allows a user to control a tuner accessory by operating the PCD and/or to control a tuner in the PCD by operating an accessory, a storage lingo that allows an accessory to store data on the PCD, and so on. Any lingo or combination of lingoes or other commands or groups of commands can be included in an accessory protocol.

In some embodiments, the accessory protocol can include commands usable by the PCD to instruct the accessory whether to provide power to a power-hungry component (such as video processor 232 and/or video port 234 for accessory 204 of FIG. 2). FIG. 3 is a table 300 listing commands usable to support control of an accessory component by a PCD according to an embodiment of the present invention. These commands can be implemented as part of a PCD accessory protocol, in the general lingo or another lingo as desired. In table 300, the direction of each command is indicated as A→P (for commands sent by an accessory to a PCD) or P→A (for commands sent by a PCD to an accessory). The payload refers to any parameters or data associated with each command.

A SinkStatus command can be sent by accessory 204 to PCD 202 to indicate whether a video sink (e.g., a display device) is currently connected to video output port 244. The payload can include a bit that can be set to a logical true state if a video sink is connected and to logical false if not. In some embodiments, accessory 204 can send the SinkStatus command in response to detecting a change in the sink status (from connected to disconnected or vice versa), with the payload bit set appropriately.

A SetComponent command can be sent by PCD 202 to accessory 204 to instruct accessory 204 to change the state of a component. For example, in some embodiments, power distribution module 234 of accessory 204 can selectably supply power to video processor 232 and/or to video-out port 244, and the payload of the SetComponent command can indicate to accessory 204 whether power should be supplied to these components. PCD 202 can determine the desired state based in part on information provided by accessory 204 (e.g., using the SinkStatus command) and in part on information as to its own internal state, such as whether video is currently being (or soon to be) supplied to accessory 204.

It will be appreciated that the commands described herein are illustrative and that variations and modifications are possible. For example, in some embodiments, PCD 202 can control the state of multiple components, and the payload of the SetComponent command can specify a component or category or group of components to which the command should be applied. In addition, state settings need not be limited to power-up and power-down. For example, a component may have multiple operating power levels, and PCD 202 can send commands to specify the power level that should be used in a particular situation.

Accessory status notifications are not limited to status of connection to a video sink; an accessory can notify a PCD of any aspect of the accessory's status that may be of use to the PCD in determining a desired operating state for a particular component. For example, an accessory can notify a PCD as to whether the accessory is drawing operating power from the PCD or another power source, whether the user has made configuration changes via a user interface of the accessory, or the like.

Figure 4:
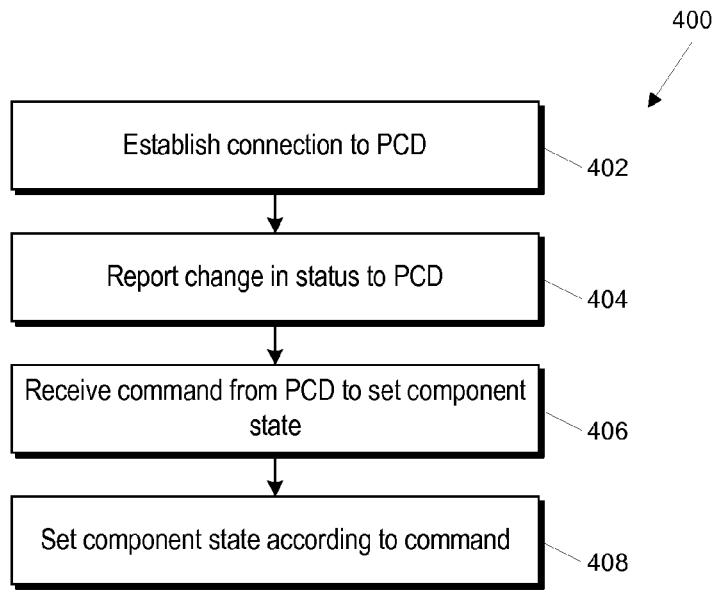
FIG. 4 is a flow diagram of a control process for an accessory according to an embodiment of the present invention.

The commands described herein or similar commands can be used to allow PCD 202 to control the state of a component of accessory 204. FIG. 4 is a flow diagram of a control process 400 for an accessory according to an embodiment of the present invention. Process 400 can be implemented in an accessory such as accessory 204 of FIG. 2.

At block 402 a connection is established to a PCD (e.g., PCD 202 of FIG. 2). At block 404, accessory 204 can report a change in status to PCD 202. For example, accessory 204 can report a change in status of connection to a video sink (or other receiving device) to PCD 202, e.g., using the SinkStatus command described above. At block 406, accessory 204 can receive a command from PCD 202 instructing accessory 204 to set the state of a component to a desired condition (e.g., powered down or powered up for video processor 232). At block 408, accessory 204 sets the state of the component in accordance with the received command.

Figure 5:
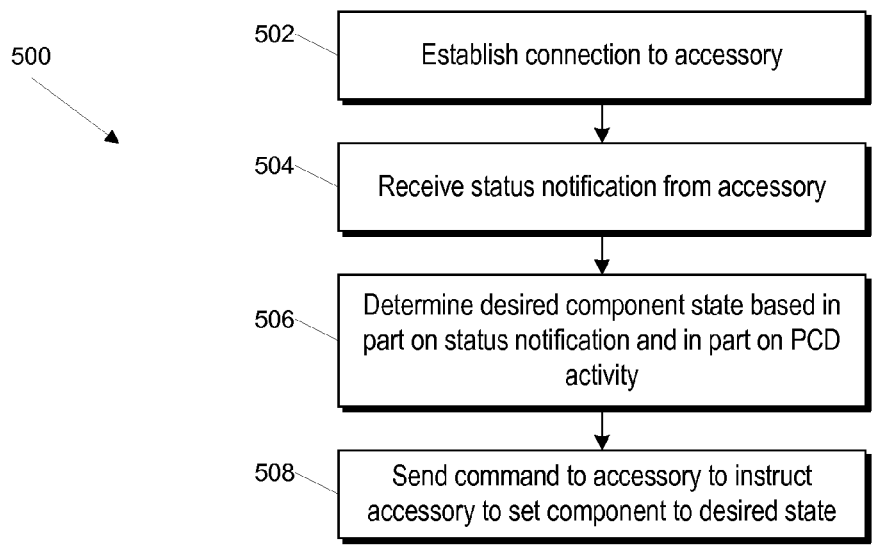
FIG. 5 is a flow diagram of a control process for a PCD according to an embodiment of the present invention.

FIG. 5 is a flow diagram of a control process 500 for a PCD according to an embodiment of the present invention. Process 500 can be implemented in a PCD such as PCD 202 of FIG. 2. At block 502, PCD 202 establishes a connection to an accessory (e.g., accessory 204 of FIG. 2). At block 504, PCD 202 can receive a status notification from the accessory, e.g., as to whether a video sink (or other receiving device) is connected (e.g., using the SinkStatus command described above); the status notification can also indicate other changes in status of the accessory.

At block 506, PCD 202 can determine a desired state for a component of accessory 204. This determination can be based in part on the most recently received status notification from the accessory. For example, if accessory 204 reports that no video receiver is connected to video output port 244, PCD 202 can determine that video processing is not currently needed and that the video components of accessory 204 (e.g., video processor 232 and/or video port 244) should be powered down.

The determination can also be based in part on information about activity internal to PCD 202, including information not provided to accessory 204. Thus, even if a video receiver is connected to video output port 244, conditions can occur under which PCD 202 determines that the video components should not be powered up. For example, if a video receiver is connected to accessory 204 but PCD 202 is not currently generating video data, PCD 202 can determine that the video components of accessory 204 should be powered down; if PCD 202 subsequently begins generating video data, PCD 202 can determine that the video components should be powered up at that time. In other embodiments, PCD 202 can take into account user preferences in determining whether the video components should be powered up, e.g., whether the user has instructed PCD 202 to present the video on its own display rather than delivering it to accessory 204. In still other embodiments, PCD 202 can consider available operating power as a factor in determining whether the video components should be powered up; for example, PCD 202 can determine that video components should be powered down to preserve battery life if a remaining power level in battery 222 drops below a minimum threshold.

At block 508, PCD 202 can send a command to accessory 204 to instruct accessory 204 to set the component to the desired state (e.g., powered up or powered down). The SetComponent command can be used. In some embodiments, PCD 202 can send the SetComponent command upon determining that a change in status of the component should occur.

Figure 6:
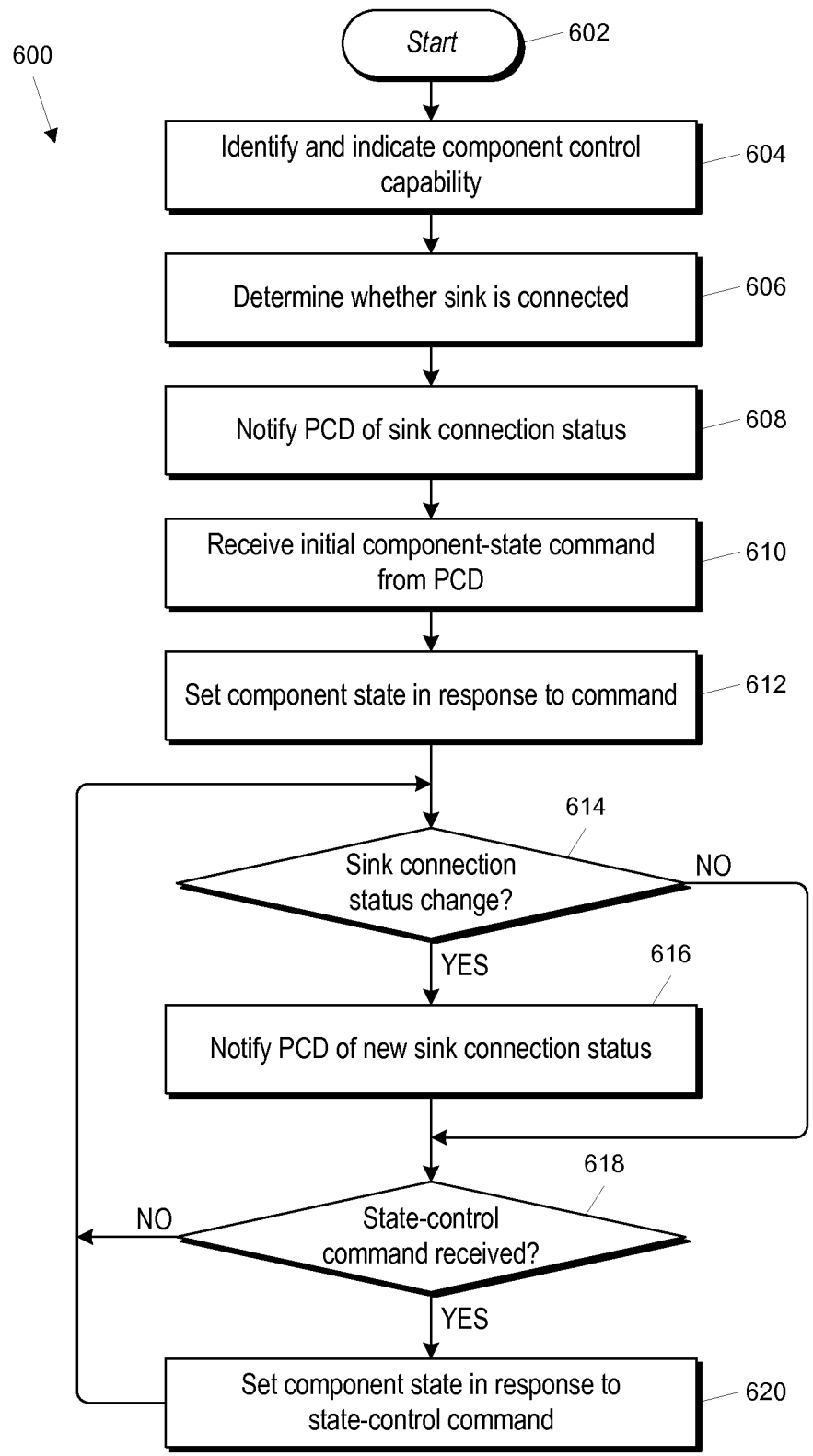
FIG. 6 is a flow diagram of a process that can be implemented in an accessory according to an embodiment of the present invention.
Figure 7:
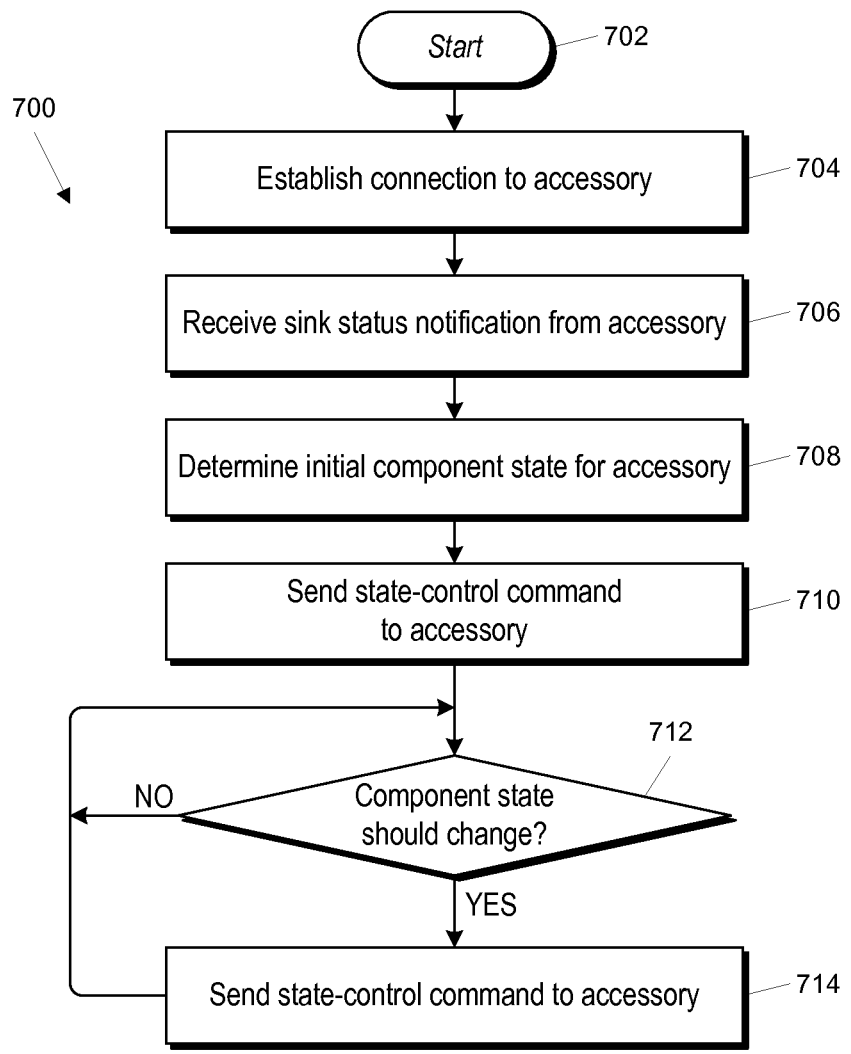
FIG. 7 is a flow diagram of a process that can be implemented in a PCD according to an embodiment of the present invention.

A further understanding of processes 400 and 500 may be had by reference to FIGS. 6 and 7.

FIG. 6 is a flow diagram of a process 600 that can be implemented in an accessory according to an embodiment of the present invention. Process 600 starts (block 602) when a connection is established between an accessory (e.g., accessory 204) and a PCD (e.g., PCD 202). At block 604, accessory 204 provides identifying information. The information can include an indication that accessory 204 is capable of dynamically changing the state of certain components (e.g., video processor 232 and/or vide output port 244) in response to commands from PCD 202.

In some embodiments, identification at block 604 can also include authentication of accessory 204 by PCD 202 (or vice versa). Authentication can be cryptographic; for instance, accessory 204 can provide a digital certificate that PCD 202 can validate, then provide a digital signature of a random string generated by PCD 202. If identification or authentication fails, process 600 can exit (not explicitly shown).

At block 606, accessory 204 determines whether a video sink (or receiver) is connected. For example, video port 244 may provide signal pins that can be monitored to detect whether a display device is connected. At block 608, accessory 204 notifies PCD 202 as to whether the video sink is connected, e.g., using the SinkStatus command described above.

At block 610, accessory 204 receives an initial command from PCD 202 to set the state of a particular component; for instance, the SetComponent command described above can be used. At block 612, accessory 204 sets the component state in response to the command. In some embodiments, a default initial component state is assumed, or the component can be left in a default state until an event occurs that causes PCD 202 to determine that the state should be changed. After block 612, accessory 204 and PCD 202 can interoperate as desired, depending on their respective functionality.

During operation, at block 614, accessory 204 can determine whether the status of the video sink (connected or disconnected) has changed. If so, then accessory 204 notifies PCD 202 of the new status (e.g., using the SinkStatus command) at block 616.

Regardless of whether the sink status has changed, at block 618 accessory 204 can determine whether a state-control command to change the component state (e.g., the SetComponent command) has been received from PCD 202. If so, accessory 204 can change the component to the new state at block 620. For example, if the SetComponent command indicates that video processor 232 should be powered down (or up), controller 230 can signal power distribution module 234 to cease (or resume) providing power on line 237. In some embodiments, video port 244 can be powered down (or up) together with video processor 232.

Powering down a component can be done in various ways. For example, in the embodiment of FIG. 2, power distribution module 234 can discontinue supplying power on line 237. In other embodiments, a clock signal to the component can be stopped, resulting in the component significantly reducing power consumption; inputs to the component can be held constant so that transistors in the component do not switch, also reducing power consumption. In further embodiments, controller 230 can write values to control registers within video controller 232 to power sections of video controller 232 up or down as desired. In still further embodiments, video controller 232 can have a reset pin with the property that application of a reset signal to that pin causes video controller 232 to enter a low-power state, and controller 230 can apply the reset signal to hold video controller 232 in the low-power state. Other techniques can also be used.

Process 600 can continue indefinitely, e.g., until such time as accessory 204 becomes disconnected from PCD 202.

FIG. 7 is a flow diagram of a process 700 that can be implemented in a PCD according to an embodiment of the present invention. Process 700 starts (block 702) when a connection is established between a PCD (e.g., PCD 202) and an accessory (e.g., accessory 204). At block 704, accessory 204 can provide identifying information, including an indication that accessory 204 is capable of dynamically changing the state of certain components (e.g., video processor 232 and/or video output port 244) in response to commands from PCD 202. Identification can also include authentication, e.g., as described above. If identification or authentication is unsuccessful, process 700 can exit (not explicitly shown).

At block 706, PCD 202 can receive a sink-status notification (e.g., the SinkStatus command) from accessory 204, indicating whether a video sink (or other receiver) is currently connected to accessory 204.

At block 708, PCD 202 can determine a desired initial state for a component of accessory 204. For example, if accessory 204 includes video processor 232, PCD 202 can determine whether video processor 232 should initially be powered up or down. The determination can be based on various criteria. For example, video processor 232 is not needed if PCD 202 is not providing a video signal via accessory interface 220; under this condition, video processor 232 can be powered down. As another example, if accessory 204 is configured to deliver processed video data to video output port 244 and if nothing is currently connected to video output port 244, then video processor 232 can be powered down. PCD 202 can determine whether a video sink is connected to video output port 244, e.g., based on the most recently received SinkStatus command.

At block 710, PCD 202 can send a component-state command (e.g., the SetComponent command) to accessory 204, thereby instructing accessory 204 to set the component to the state determined at block 708. In some embodiments, a default initial component state is assumed, or the component can be left in a default state until an event occurs that causes PCD 202 to determine that the state should be changed. After block 710, PCD 202 and accessory 204 can interoperate as desired, depending on their respective functionality.

During operation, at block 712, PCD 202 can determine whether the component state should be changed. For example, if a new SinkStatus command is received from accessory 204, it may be desirable to change the state of video processor 232, e.g., powering up video processor 232 when a monitor (or other video sink) becomes connected and powering down video processor 232 when the video sink becomes disconnected. As another example, PCD 202 can determine that the component state should be changed based on activity within PCD 202, e.g., powering up video processor 232 when PCD 202 initiates sending of video data to accessory 204 and powering down video processor 232 when PCD 202 terminates sending of video data to accessory 204. At block 714, if the component state should be changed, PCD 202 can send a new component-state command to accessory 204 to instruct accessory 204 to set the component to the new state.

Process 700 can continue indefinitely, e.g., until such time as accessory 204 becomes disconnected from PCD 202.

It will be appreciated that the processes described herein are illustrative and that variations and modifications are possible. Steps described as sequential may be executed in parallel, order of steps may be varied, and steps may be modified, combined, added or omitted. For instance, determinations regarding sink status changes and changes to component state can be interrupt driven. An accessory can have different components that are subject to different criteria for powering up or powering down (not limited to video components); a PCD can apply the appropriate rules and send separate state-control commands related to different components.

While the invention has been described with respect to specific embodiments, one skilled in the art will recognize that numerous modifications are possible. For example, a "PCD" refers generally to any portable electronic device with any form of communication and/or media playback capability; a broad range of functionality may be incorporated. Similarly, the term "accessory" includes any electronic device capable of connecting with a PCD.

A video converter is referred to herein as an example of an accessory with a power-consuming component that may be used or unused depending on the current activity of the PCD and/or on whether a receiving device is connected to the accessory. As described above, the PCD can determine whether the power-consuming component is to be used or unused and can instruct the accessory to power the component up or down accordingly. Thus, power consumption by the accessory can be reduced by powering down a component that is not in use at a given time and powering the component up when it is to be used, under control of the PCD. While a video converter is used as an example, embodiments of the invention are not limited to video converters; PCD-controlled power management can be implemented for and in any accessory with power-consuming components that are used under certain conditions and unused under other conditions.

A SinkStatus command is referred to herein as an example of status information that an accessory may provide to a PCD, but other status information affecting or relating to operation of any power-consuming component of an accessory can be provided to the PCD, e.g., using a suitable command.

Further, while some accessories can draw operating power from the PCD, this is not required; accessories with an independent power source can use techniques described herein to reduce their power consumption, resulting in more efficient and less costly operation.

Embodiments of the present invention can be realized using any combination of dedicated components and/or programmable processors and/or other programmable devices. The various processes described herein can be implemented on the same processor or different processors in any combination. Accordingly, where components are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable media encoded with the program code may be packaged with a compatible electronic device, or the program code may be provided separately from electronic devices (e.g., via Internet download).

Thus, although the invention has been described with respect to specific embodiments, it will be appreciated that the invention is intended to cover all modifications and equivalents within the scope of the following claims.

What is claimed is:

1. An accessory comprising:
   an interface configured to communicate with a portable computing device;
   a power-consuming component;
   a second component configurable to interact with the power-consuming component; and
   a controller coupled to the interface and the power-consuming component, the controller being configured to:
      determine whether the second component is currently configured to interact with the power-consuming component and report a configuration status to the portable computing device based on the determination;
      receive a state-control command from the portable computing device, the state-control command specifying a desired state for the power-consuming component; and
      set the power-consuming component to the desired state in response to the state-control command.

2. The accessory of claim 1 wherein the power-consuming component is a video processor.

3. The accessory of claim 2 wherein the second component is a video output port providing a connection for an external display.

4. The accessory of claim 3 wherein the controller is further configured to determine whether the second component is currently configured to interact with the power-consuming component based on whether an external display is connected to the video output port.

5. The accessory of claim 1 wherein the power-consuming component includes a radio-frequency transmitter or receiver.

6. The accessory of claim 1 wherein the power-consuming component includes hardware for reading from or writing to a removable computer-readable storage medium.

7. A method of operating an accessory having a video processor, the method comprising:
   establishing first connection, by the accessory, to a portable computing device;
   determining, by the accessory, the status of a second connection between the accessory and a receiving device for video signals provided by the accessory;
   reporting to the portable computing device, by the accessory, the status of the second connection;
   receiving, by the accessory, a first state-control command from the portable computing device, the first state-control command instructing the accessory to set a state of the video processor of the accessory to a first specified state; and setting the state of the component to the first specified state.

8. The method of claim 7 wherein the accessory reports a status of the second connection as being one of a connection-present status or a connection-absent status.

9. The method of claim 8 wherein:
in the event that the status is reported as the connection-absent status, the first specified state is a powered-down state; and
in the event that the status is reported as the connection-present status, the first specified state is either the powered-down state or a powered-up state.

10. The method of claim 7 further comprising:
subsequently to setting the state of the video processor to the first specified state, receiving, by the accessory, a second state-control command from the portable computing device, the second state-control command instructing the accessory to set the state of the video processor to a second specified state different from the first specified state; and
setting, by the accessory, the state of the video processor to the second specified state.

11. A computer readable storage medium encoded with program instructions that, when executed by a controller in an accessory, cause the accessory to execute a method comprising:
establishing a first connection to a portable computing device;
reporting to the portable computing device a status of a second connection between the accessory and a receiving device;
receiving a first state-control command from the portable computing device, the first state-control command instructing the accessory to set a state of a component of the accessory to a first specified state; and
setting the state of the component to the first specified state.

12. The computer-readable storage medium of claim 11 wherein the accessory reports a status of the second connection as being one of a connection-present status or a connection-absent status.

13. The computer-readable storage medium of claim 11 wherein:
in the event that the status is reported as the connection-absent status, the first specified state is a powered-down state; and
in the event that the status is reported as the connection-present status, the first specified state is either the powered-down state or a powered-up state.

14. The computer-readable storage medium of claim 11 wherein the method further comprises:
subsequently to setting the state of the component to the first specified state, receiving a second state-control command from the portable computing device, the second state-control command Instructing the accessory to set the state of the component to a second specified state different from the first specified state; and
setting the state of the component to the second specified state.

15. The computer-readable storage medium of claim 11 wherein the method further comprises:
subsequently to setting the state of the component to the first specified state, reporting to the portable computing device a change in the status of the second connection;
receiving a second state-control command from the portable computing device, the second state-control command instructing the accessory to set the state of the component to a second specified state different from the first specified state; and
setting the state of the component to the second specified state.

16. The computer-readable storage medium of claim 15 wherein the first specified state is one of a powered-up state or a powered-down state and the second specified state is the other of the powered-up state or the powered-down state.

17. A method of operating a portable computing device, the method comprising:
establishing, by the portable computing device, a connection to an accessory having a power-consuming component;
receiving a status notification from the accessory;
determining, by the portable computing device, a desired state for the power-consuming component of the accessory, the determination being based in part on the status notification received from the accessory and in part on an operating condition of the portable computing device; and
sending a state-control command to the accessory, the state-control command instructing the accessory to set a state of the power-consuming component to the desired state.

18. The method of claim 17 wherein the desired state is one of a high-power state or a low-power state.

19. The method of claim 17 wherein the desired state is one of a plurality of different available states, wherein the different available states have different power consumption characteristics.

20. The method of claim 17 wherein the received status notification indicates whether a receiving device that interacts with the power-consuming component is connected to the accessory.

21. The method of claim 20 wherein the determination of the desired state for the power-consuming component of the accessory is based in part on whether the operating condition of the portable computing device is such that the portable computing device sends a signal to the accessory that should be processed by the power-consuming component.

22. A portable computing device comprising:
an interface configured to communicate with an accessory and to provide a video signal to the accessory; and
a processor coupled to the interface and configured to:
receive a status notification from the accessory indicating whether an external video display device is connected to the accessory;
determine a desired state of a video processor of the accessory, the determination being based in part on the received status notification and in part on whether the portable computing device is generating a video signal; and
send a state-control command to the accessory, the state-control command instructing the accessory to set a state of the video processor to the desired state.

23. portable computing device of claim 22 further comprising:
a user interface including an internal display device; and
a plurality of video paths including a first video path connected to the internal display device and a second video path connected to the interface,
wherein the processor is further configured to select one of the plurality of video paths to receive a video signal and to determine the desired state of the video processor of the accessory based in part on whether the second video path is selected.

24. The portable computing device of claim 22 further comprising:
- a battery; and
- a power management circuit coupled to the battery and the processor and configured to supply power from the battery to the accessory via the interface,
- wherein the processor is further configured to determine the desired state of the video processor of the accessory based in part on an available power level of the battery.

* * * * *

UNITED STATES PATENT AND TRADEMARK OFFICE
CERTIFICATE OF CORRECTION

PATENT NO.         : 8,438,408 B2
APPLICATION NO.    : 12/764019
DATED              : May 7, 2013
INVENTOR(S)        : Sylvain R. Y. Louboutin et al.

It is certified that error appears in the above-identified patent and that said Letters Patent is hereby corrected as shown below:

In claims 7, 14, and 23, please make the corrections as shown below:

Column 14:
7. A method of operating an accessory having a video processor, the method comprising: establishing a first connection, by the accessory, to a portable computing device; determining, by the accessory, the status of a second connection between the accessory and a receiving device for video signals provided by the accessory; reporting to the portable computing device, by the accessory, the status of the second connection; receiving, by the accessory, a first state-control command from the portable computing device, the first state-control command instructing the accessory to set a state of the video processor of the accessory to a first specified state; and setting the state of the component to the first specified state.

Column 15:
14. The computer-readable storage medium of claim 11 wherein the method further comprises: subsequently to setting the state of the component to the first specified state, receiving a second state-control command from the portable computing device, the second state-control command ~~Instructing~~ instructing the accessory to set the state of the component to a second specified state different from the first specified state; and setting the state of the component to the second specified state.

Column 16:
23. The portable computing device of claim 22 further comprising: a user interface including an internal display device; and a plurality of video paths including a first video path connected to the internal display device and a second video path connected to the interface, wherein the processor is further configured to select one of the plurality of video paths to receive a video signal and to determine the desired state of the video processor of the accessory based in part on whether the second video path is selected.

Signed and Sealed this
Thirtieth Day of July, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,438,408 B2  
APPLICATION NO. : 12/764019  
DATED : May 7, 2013  
INVENTOR(S) : Sylvain R. Y. Louboutin et al.

It is certified that error appears in the above-identified patent and that said Letters Patent is hereby corrected as shown below:

In the Claims:

Column 14, line 57 - Column 15, line 4, Claim 7 should read:
--7. A method of operating an accessory having a video processor, the method comprising: establishing a first connection, by the accessory, to a portable computing device; determining, by the accessory, the status of a second connection between the accessory and a receiving device for video signals provided by the accessory; reporting to the portable computing device, by the accessory, the status of the second connection; receiving, by the accessory, a first state-control command from the portable computing device, the first state-control command instructing the accessory to set a state of the video processor of the accessory to a first specified state; and setting the state of the component to the first specified state.--

Column 15, lines 51-60, Claim 14 should read:
--14. The computer-readable storage medium of claim 11 wherein the method further comprises: subsequently to setting the state of the component to the first specified state, receiving a second state-control command from the portable computing device, the second state-control command ~~Instructing~~ instructing the accessory to set the state of the component to a second specified state different from the first specified state; and setting the state of the component to the second specified state.--

Column 16, lines 57-67, Claim 23 should read:
--23. The portable computing device of claim 22 further comprising: a user interface including an internal display device; and a plurality of video paths including a first video path connected to the internal display device and a second video path connected to the interface, wherein the processor is further configured to select one of the plurality of video paths to receive a video signal and to determine the desired state of the video processor of the accessory based in part on whether the second video path is selected.--

This certificate supersedes the Certificate of Correction issued July 30, 2013.

Signed and Sealed this
Twentieth Day of August, 2013

Teresa Stanek Rea
*Acting Director of the United States Patent and Trademark Office*